United States Patent
Kim et al.

(10) Patent No.: US 8,498,320 B2
(45) Date of Patent: Jul. 30, 2013

(54) MELTING FURNACE HAVING A GAS SUPPLYING APPARATUS

(75) Inventors: Deuk Man Kim, Daejeon (KR); Hyun Je Cho, Daejeon (KR); Seok Mo Choi, Daejeon (KR); Cheon Woo Kim, Daejeon (KR); Tae Won Hwang, Daejeon (KR)

(73) Assignee: Korea Hydro & Nuclear Power Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 13/466,283

(22) Filed: May 8, 2012

(65) Prior Publication Data
US 2013/0070803 A1      Mar. 21, 2013

(30) Foreign Application Priority Data
Sep. 19, 2011    (KR) .................. 10-2011-0094293

(51) Int. Cl.
*H05B 6/34* (2006.01)
*H05B 6/22* (2006.01)
*C03B 5/16* (2006.01)

(52) U.S. Cl.
USPC .......... 373/146; 373/154; 65/134.4; 65/134.5

(58) Field of Classification Search
USPC ............. 373/36, 146, 72, 77, 86, 85, 66, 154; 588/311, 314, 11, 320, 405, 900; 65/134.4, 65/134.5; 110/196, 197, 208, 214, 180, 182.5; 165/157, 159, 164, 165, 168, 169; 266/241, 266/244
See application file for complete search history.

(56) References Cited

U.S. PATENT DOCUMENTS

| | | | |
|---|---|---|---|
| 6,108,363 A * | 8/2000 | Haissig | 373/77 |
| 6,576,807 B1 * | 6/2003 | Brunelot et al. | 588/314 |
| 6,614,831 B2 * | 9/2003 | Shver | 373/66 |
| 6,999,495 B2 * | 2/2006 | Popenov et al. | 373/71 |
| 7,951,325 B2 * | 5/2011 | Higgins et al. | 373/75 |

FOREIGN PATENT DOCUMENTS

KR    10-2001-0101107 A    11/2011

* cited by examiner

*Primary Examiner* — Tu B Hoang
*Assistant Examiner* — Hung D Nguyen
(74) *Attorney, Agent, or Firm* — Rabin & Berdo, P.C.

(57) ABSTRACT

A melting furnace includes a gas supplying unit configured to protrude inwardly of the melting furnace to supply a gas to the melting furnace, the gas supplying unit including a gas supplying pipe configured to penetrate the melting furnace to protrude inwardly of the melting furnace and configured to have a nozzle hole formed at a front end thereof; and a cooling passage pipe provided outside the gas supplying pipe to include a second cooling passage through which a cooling liquid flows, the second cooling passage being directly connected to a first cooling passage through which the cooling liquid is circulated along a wall of the melting furnace.

4 Claims, 4 Drawing Sheets

MELTING FURNACE HAVING A GAS SUPPLYING APPARATUS

CROSS REFERENCE

This application claims the benefit under 35 U.S.C. §119 a of a Korean patent application filed in the Korean Intellectual Property Office on Sep. 19, 2011 and assigned Serial No. 10-2011-0094293, and the entire disclosure of which is hereby incorporated by reference.

BACKGROUND OF THE INVENTION

1. Field of the Invention

The present invention relates to a melting furnace having a gas supplying apparatus, and more particularly, to a melting furnace having a gas supplying apparatus in which gas, particularly, for example, oxygen is provided to control a redox state of a vitrified molten material and stir the molten material to increase a processing capacity.

2. Description of the Related Art

It is highly important to safely dispose, store, and manage waste, particularly hazardous waste such as radioactive waste. One method for disposal and storage of the waste is vitrification, which disposes the waste by using glass. In this method, the waste such as the radioactive waste, slurry, contaminated ground, or industry waste is embedded in a glassy matrix such that the waste is not exposed to a surrounding environment and is permanently isolated.

Generally, in order to vitrificate waste, a waste vitrification apparatus melt a glass formation agent and the waste in a melting furnace, wherein a volatile component of the waste is exhausted through a waste treatment process of an exhaust gas and a toxic substance such as radionuclide or heavy metal remains for a certain time in which the toxic substance is heated to become a part of a glass network structure until a uniform mixture of molten glass is formed. The molten glass is discharged to form vitrified waste.

Generally, the melting furnace may use various heating methods and a cold crucible induction melter ("CCIM"), which uses induction heating, is configured to include a melting chamber of a cylindrical shape in which an electrical insulator is filled among a plurality of metal sectors, each of which has coolant circulating therein, and a high-frequency induction coil, provided outside of the melting chamber. A material, for example, waste and glass in the melting chamber is melted by high-frequency current applied to the induction coil. For example, Korea Patent No. 10-0501640, issued on Jul. 6, 2005, discloses "Method and Device for Incineration and Vitrification of Waste, in particular Radioactive Waste."

Specifically, FIG. 1 is a view illustrating a configuration of a general inductive heating vitrification apparatus. In a chamber 10 comprising a plurality of metal sectors each of which is electrically insulated from one another has a cooling passage 12 formed therein, cooling water is circulated along the cooling passage 12 through pipes 12a and 12b connected to an external cooling water circulation system so that the entire chamber 10 maintains an appropriate temperature.

Glass within the chamber 10 maintains a molten state by high frequency current applied to an inductive coil 20 provided outside the chamber 10 and combustion gas among waste D injected through a waste supplying apparatus 30 is discharged to an exhaust gas processing apparatus through an exhaust unit 40. Molten glass is discharged outside through a discharging unit 50 provided in a lower portion of an exhaust hole 51.

A first oxygen supplying apparatus 60 is provided in proximity of the waste supplying apparatus 30 in an upper portion of the chamber 10 and oxygen supplied through the first oxygen supplying apparatus 60 optimizes combustion of the injected waste.

Meanwhile, in the low temperature melting furnace, when internal molten material does not include a bubble due to an influence of water cooling of a wall and a bottom surface of the melting furnace, a significant temperature difference exists inside the molten material. In this case, viscosity of the melting glass also has a wide distribution, and accordingly, a flow of the molten glass may not be effective due to a difference in viscosity such that the waste injected for vitrification may not be transmitted to an entire area of the molten glass. In such circumstance, uniform molten glass is difficult to produce and a waste processing rate may be reduced. Particularly, in the inductive heating low temperature melting furnace (or cold crucible induction melter), an operative problem may occur such that an arc in the metal sector may be generated due to a metal material formed in a lower portion of the chamber.

To avoid this problem, a second oxygen supplying apparatus 70 for supplying oxygen is provided in the lower portion of the chamber 10 to generate the bubble in the molten glass.

FIG. 2 is a view illustrating an oxygen supplying apparatus provided in a conventional vitrification apparatus. The oxygen supplying apparatus 70 includes a casing 71 that penetrates the lower portion of the chamber to be fixed, an oxygen supplying pipe 72 provided within the casing 71 to supply oxygen into the chamber 10, and a cooling water inlet pipe 73 and a cooling water outlet pipe 74 for circulating the cooling water.

An exhaust hole 72a is formed on an upper portion of the oxygen supplying pipe 72 so that the oxygen supplied from the oxygen supplying pipe 72 is introduced to the chamber 10 through the exhaust hole 72a to produce the bubble in the molten glass.

However, in the conventional oxygen supplying apparatus, an oxygen supplying pipe, and the cooling water inlet pipe and the cooling water outlet pipe for circulating the cooling water are fixed and supported by a separate casing and requires a cooling water pipe for cooling the oxygen supplying pipe separately from a cooling water circulation system for cooling the wall of the chamber 10, thereby adding complexity to the structure as well as causing difficulty in repair when breakdown occurs and inconvenience in maintenance.

SUMMARY OF THE INVENTION

Accordingly, the present invention has been made in view of the above problems, and the present invention is to provide a low temperature melting furnace including a gas supplying apparatus, which has a simple installment structure such that the gas supplying apparatus has improved durability under a high temperature environment and easy repair and maintenance is realized.

In one aspect of the present invention, a melting furnace includes a gas supplying unit configured to protrude inwardly of the melting furnace to supply a gas to the melting furnace, the gas supplying unit including a gas supplying pipe configured to penetrate the melting furnace to protrude inwardly of the melting furnace and configured to have a nozzle hole formed at a front end thereof; and a cooling passage pipe provided outside the gas supplying pipe to include a second cooling passage through which a cooling liquid flows, the second cooling passage being directly connected to a first cooling passage through which the cooling liquid is circulated along a wall of the melting furnace.

In one embodiment, the gas supplying pipe is fixed to and supported by an external wall of the melting furnace and the cooling passage pipe.

In one embodiment, the nozzle hole formed at the front end of the gas supplying pipe is fixed in a horizontal direction.

In one embodiment, the cooling passage pipe is provided to be higher than at least the nozzle hole.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
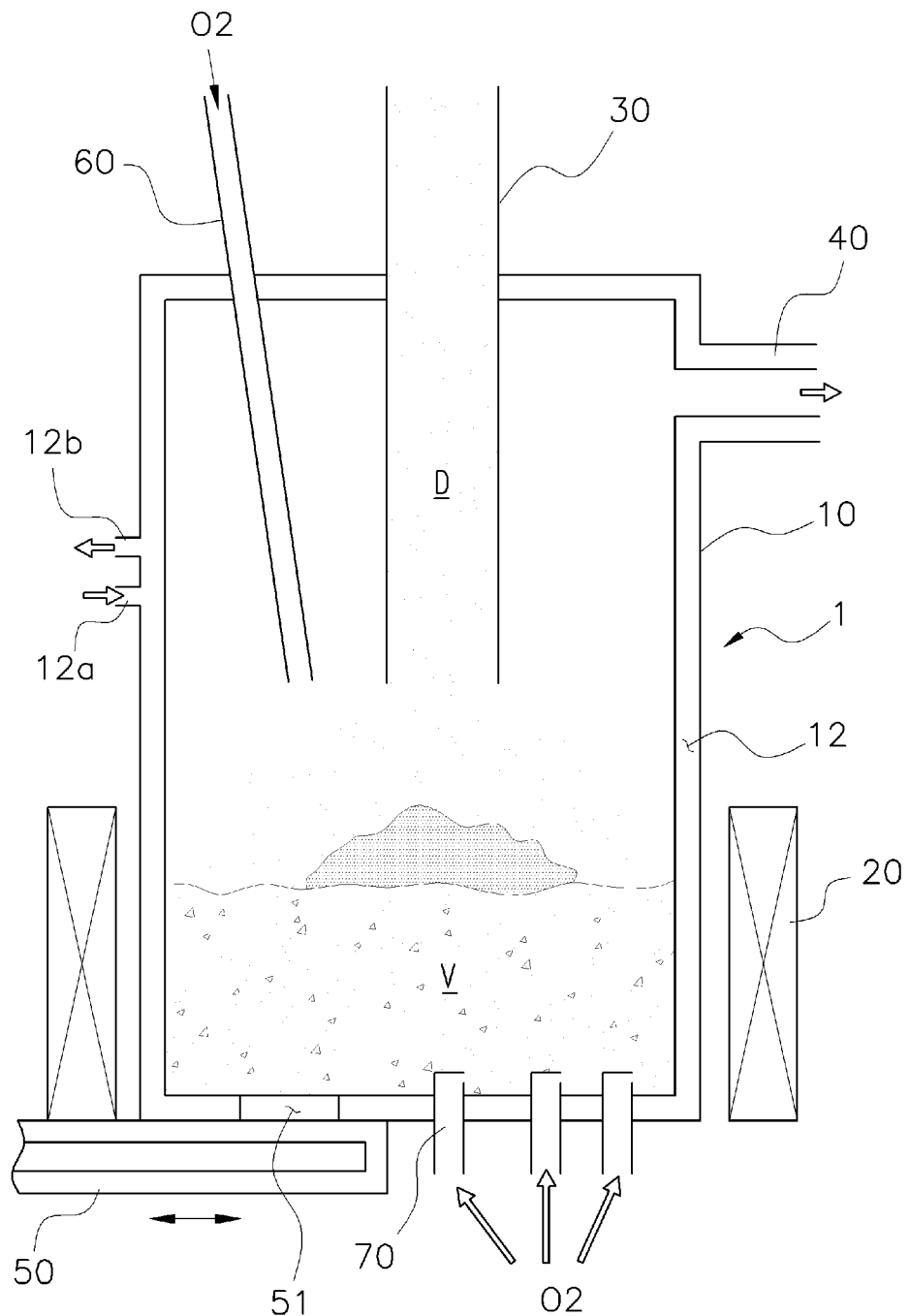
FIG. 1 is a view illustrating an entire configuration of a general low temperature melting furnace.
Figure 2:
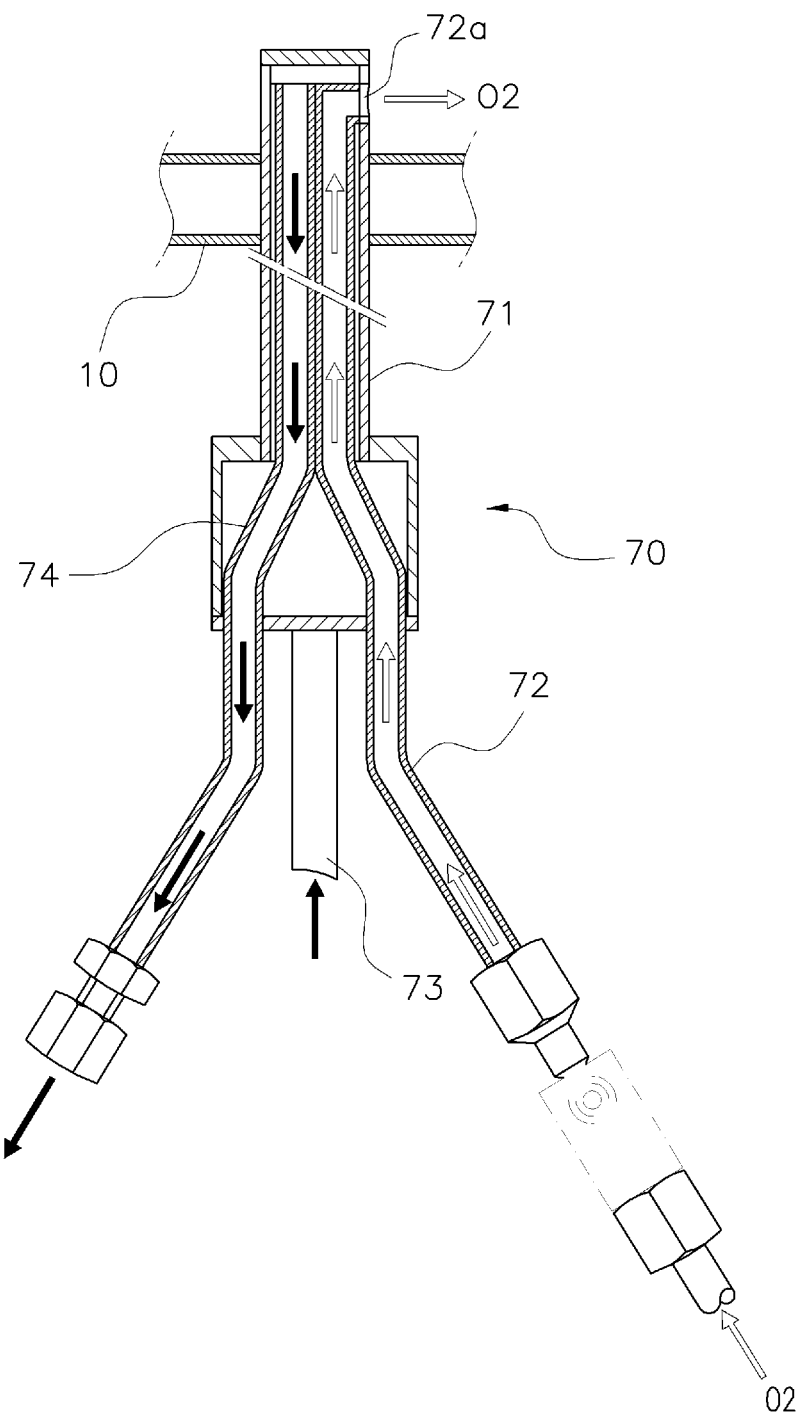
FIG. 2 is a view illustrating an oxygen supplying apparatus of FIG. 1.
Figure 3:
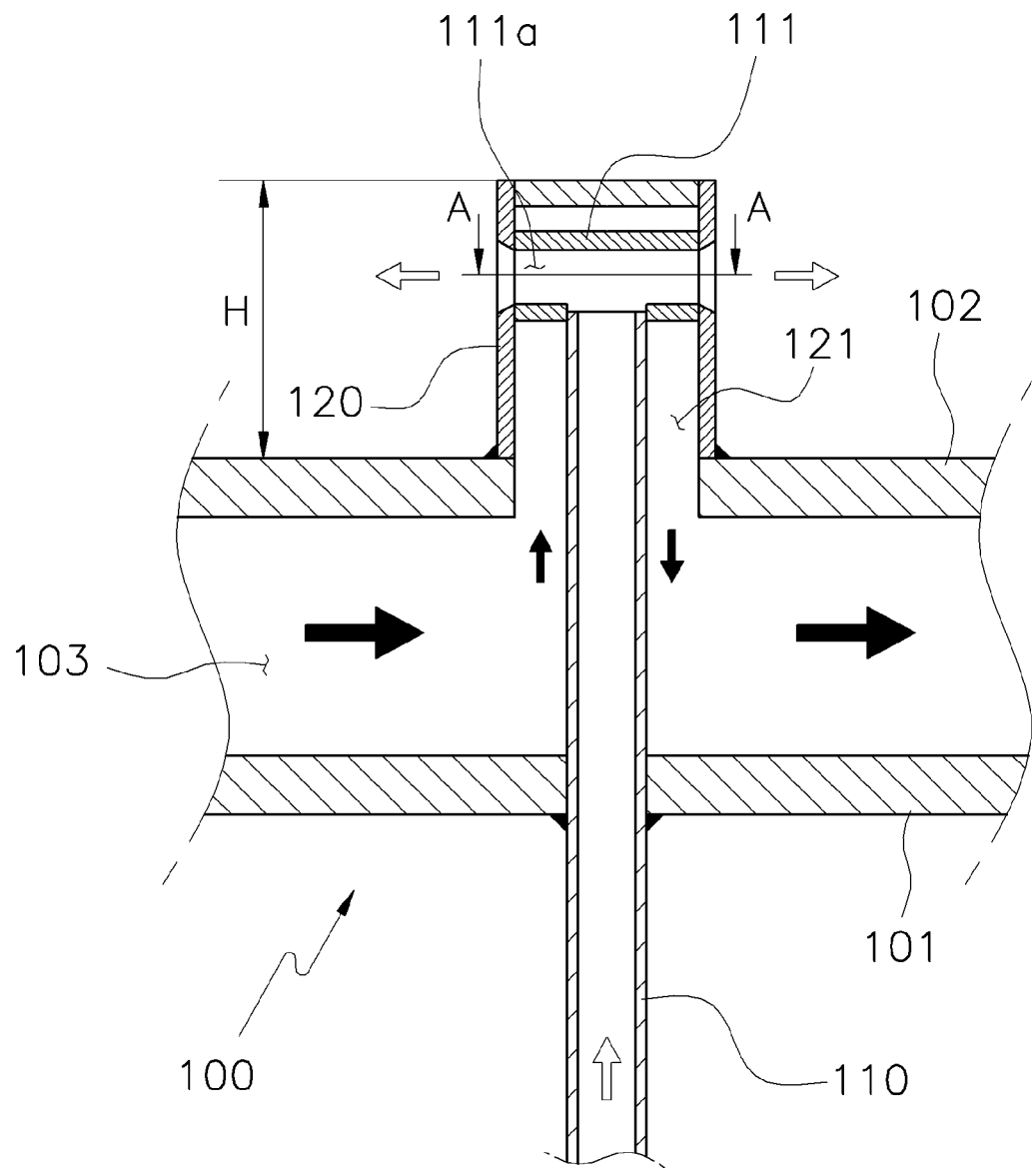
FIG. 3 is a view illustrating a gas supplying apparatus of a melting furnace according to the present invention.
Figure 4:
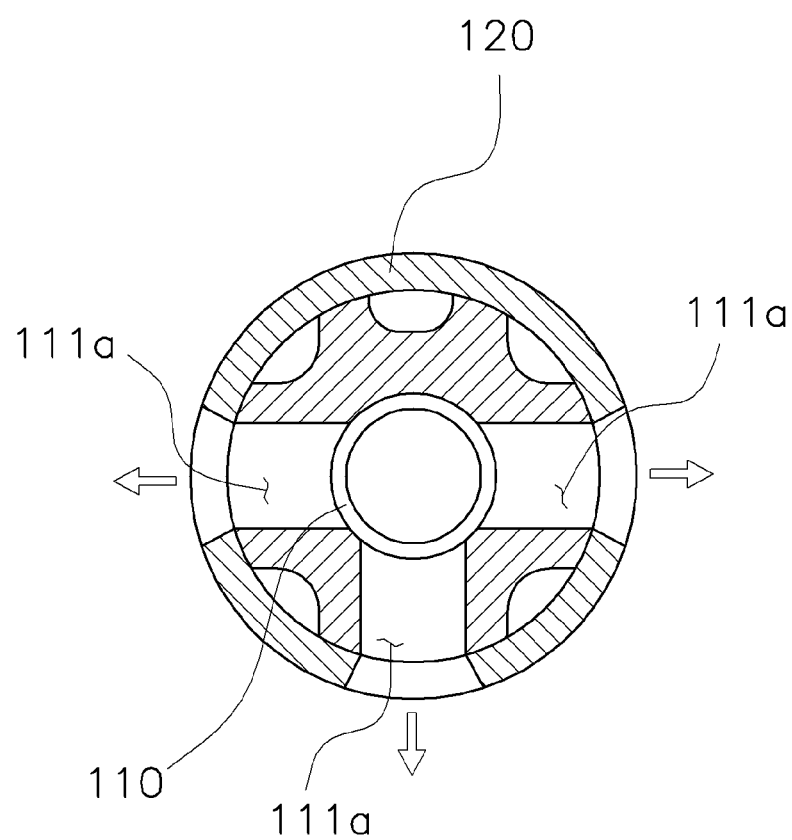
FIG. 4 is a cross sectional view of FIG. 3 taken line along line A-A.

Exemplary embodiments of the present invention will be described herein below with reference to the accompanying drawings.

A low temperature melting furnace according to the present invention having a gas supplying unit that is formed to protrude inwardly of the melting furnace 100 to supply gas to the melting furnace 100 includes a gas supplying pipe 110 penetrating the melting furnace 100 and protruding inwardly of the melting furnace 100, a nozzle hole 111a being formed at a front end of the gas supplying pipe 110, and a cooling passage pipe 120 provided outside the gas supplying pipe 110 to include a second cooling passage 121 through which cooling liquid flows, the second cooling passage 121 being directly connected to a first cooling passage 103 through which the cooling liquid is circulated along a wall of the melting furnace 100.

The low temperature melting furnace 100 according to the present invention is configured in a double wall structure 101, 102 having the first cooling passage 103 through which the cooling liquid for cooling the wall flows. The low temperature melting furnace 100 may be provided with a plurality of metal sectors that are electrically insulated from one another, each of which has a cooling passage formed therein for circulating cooling water, as already mentioned in the description of the related art. Meanwhile, a heating method of the melting furnace 100 may include, but is not limited thereto, induction heating.

The gas supplying unit includes a gas supplying pipe 110 for supplying gas to the melting furnace 100 and the cooling passage pipe 120 for cooling the gas supplying pipe 110.

The gas supplying pipe 110 penetrates and protrudes inwardly of the melting furnace 100 comprising the double wall 101, 102 and has the nozzle hole formed at a front end thereof, the gas being discharged through the nozzle hole.

In the present invention, the nozzle hole 111a formed at the front end of the gas supplying pipe 110 may be provided by a nozzle pipe 111 that is horizontally fixed, wherein a number and an orientation of the nozzle hole may be variably modified.

A lower portion of the gas supplying pipe 110 is fixed to an external wall 101 of the melting furnace 100 and an upper portion thereof is fixed to and supported by the cooling passage pipe 120 along with the nozzle pipe 111 so that the gas supplying pipe 110 may be securely fixed to and supported by the melting furnace 100 without requiring a separate fixing structure.

The cooling passage pipe 120 is positioned outside the gas supplying pipe 110 and fixed to an internal wall 102 of the melting furnace 100 and includes the second cooling passage 121 through which the cooling liquid flows, the second cooling passage 121 being directly connected to the first cooling passage 103 through which the cooling liquid is circulated within the double wall of the melting furnace 100.

The cooling passage pipe 120 having a diameter greater than that of the gas supplying pipe 110 is preferably positioned on the same center axis of the gas supplying pipe 110.

Also, according to the present invention, a height H of the cooling passage pipe 120 is configured to be higher than at least the nozzle pipe 111 so that the cooling passage pipe 120 may surround a maximum area of the gas supplying pipe 110, thereby improving cooling efficiency of the gas supplying pipe 110.

In the present invention, a material or shape of the gas supplying pipe 110 is not limited to a specific type. Preferably, a seamless tube formed in stainless steel having improved corrosion-resistance and thermal resistance may be used.

In the low temperature melting furnace 100 having the gas supplying unit according to the present invention that is configured as described above, the gas (e.g., oxygen) is discharged to the nozzle pipe 111 through the gas supplying pipe 110 and supplied to inside the melting furnace 100 to generate a bubble. Meanwhile, the cooling liquid that circulates along the first cooling passage 103 of the melting furnace 100 also circulates along the second cooling passage 121 of the cooling passage pipe 120, thereby cooling the gas supplying unit so that the gas supplying apparatus has improved durability in a high temperature environment.

The gas supplying apparatus according to the present invention is installed on a bottom surface of the low temperature melting furnace in multiple numbers to generate the bubble in an internal molten material, thereby producing a uniform molten material.

In addition, it should be noted that the gas supplying apparatus according to the present invention may apply not only to the gas supplying apparatus provided in a lower portion of the melting furnace for directly producing the bubble in the internal molten material but also to an oxygen supplying apparatus provided in an upper portion of the melting furnace for improving combustion of the waste injected to the melting furnace, thereby effectively cooling the oxygen supplying apparatus. The low temperature melting furnace having the gas supplying apparatus according to the present invention is configured such that the gas supplying unit that supplies gas to inside the melting furnace is formed integrally with the lower portion of the melting furnace and shares the cooling liquid for cooling the melting furnace, thereby cooling the gas supplying unit. Therefore, the gas supplying apparatus may have improved durability in the high temperature environment, a risk of breakdown may be minimized by providing a simple structure, and easy repair and maintenance may be realized.

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

What is claimed is:

1. A melting furnace comprising:

double walls having a first cooling passage therebetween; and a gas supplying unit configured to supply a gas to the melting furnace, the gas supplying unit comprising:

a cooling passage pipe having a second cooling passage thereinside and protruding from a bottom to an inside of the melting furnace, an end of the cooling passage pipe connected only to an inner wall of the double walls such that a cooling liquid commutes between the first cooling passage and the second cooling passage, the cooling passage pipe having at least one opening in a side thereof;

a gas supplying pipe penetrating the double walls having the first cooling passage and one end portion of the gas supplying pipe positioned inside the cooling passage pipe; and a nozzle pipe connected perpendicularly to the gas supplying pipe and having at least one nozzle hole formed at an end thereof, the nozzle hole leading to the opening in the side of the cooling passage pipe.

2. The melting furnace according to claim 1, wherein a portion of a body of the gas supplying pipe is fixed to and supported by an outer wall of the double walls of the melting furnace and the end portion of the gas supplying pipe is fixed to and supported by the cooling passage pipe along with the nozzle pipe.

3. The melting furnace according to claim 1, wherein a height of the cooling passage pipe is greater than a diameter of the nozzle hole.

4. The melting furnace according to claim 1, wherein the cooling passage and the gas supplying pipe have the same center axis.

* * * * *